(12) United States Patent
McMillan et al.

(10) Patent No.: US 11,990,600 B2
(45) Date of Patent: May 21, 2024

(54) ELECTRODE BLANKS FOR USE IN ELECTROCHEMICAL DEVICES

(71) Applicant: Pacesetter, Inc., Sylmar, CA (US)

(72) Inventors: Diana McMillan, Greenville, SC (US); Christopher Hallmark, Pickens, SC (US)

(73) Assignee: Pacesetter, Inc., Sylmar, CA (US)

(*) Notice: Subject to any disclaimer, the term of this patent is extended or adjusted under 35 U.S.C. 154(b) by 152 days.

(21) Appl. No.: 17/031,871

(22) Filed: Sep. 24, 2020

(65) Prior Publication Data

US 2021/0098772 A1 Apr. 1, 2021

Related U.S. Application Data

(60) Provisional application No. 62/908,578, filed on Sep. 30, 2019.

(51) Int. Cl.
*H01M 4/04* (2006.01)
*H01M 4/02* (2006.01)
*H01M 4/08* (2006.01)
*H01M 4/54* (2006.01)

(52) U.S. Cl.
CPC ....... *H01M 4/0435* (2013.01); *H01M 4/0471* (2013.01); *H01M 4/08* (2013.01); *H01M 4/54* (2013.01); *H01M 2004/028* (2013.01); *H01M 2220/30* (2013.01)

(58) Field of Classification Search
CPC .... H01M 4/0435; H01M 4/0471; H01M 4/08; H01M 4/54; H01M 2004/028
See application file for complete search history.

(56) References Cited

U.S. PATENT DOCUMENTS

| | | | |
|---|---|---|---|
| 2015/0280206 A1* | 10/2015 | Schroedle | H01M 4/0435 29/17.2 |
| 2018/0083260 A1* | 3/2018 | Jiang | H01M 4/0471 |
| 2021/0074992 A1* | 3/2021 | Jiang | H01M 4/0471 |
| 2021/0288302 A1* | 9/2021 | Jamadar | H01M 4/0404 |

* cited by examiner

*Primary Examiner* — Brian R Ohara
*Assistant Examiner* — Emily Elizabeth Freeman

(57) ABSTRACT

Fabricating the electrode blank includes baking a blank precursor. The blank precursor contains the components of an electrode active medium including an active material. Fabricating the electrode blank also includes performing one or more post-bake calender operations on the blank precursor after baking the blank precursor. Each post-bake calender operation includes calendering the blank precursor.

17 Claims, 2 Drawing Sheets

ELECTRODE BLANKS FOR USE IN ELECTROCHEMICAL DEVICES

RELATED APPLICATIONS

This application claims the benefit of U.S. Provisional Patent Application Ser. No. 62/908,578, filed on Sep. 30, 2019, entitled "Electrode Blanks for Use in Electrochemical Devices," and incorporated herein in its entirety.

FIELD

The invention relates to electrochemical energy storage devices. In particular, the invention relates to electrodes in batteries.

BACKGROUND

Batteries used in implantable medical devices (IMDs), such as cardiac pacemakers and implantable cardioverter defibrillators (ICDs), are required to meet high quality and performance specifications and reliability. They need to have high energy density, high rate capability and long shelf life. Since replacement of the battery of an IMD means that the patient must undergo surgery, batteries for IMDs must have a long service life. Improvement to the reliability, performance, and lifetime of lithium anode batteries is highly desirable.

The fabrication process for a battery electrode, especially the cathode in case of a primary battery is critical to achieve these goals. In the fabrication of components for such batteries, electrodes, including anodes and cathodes, are fabricated, at least in part, from electrode active blanks.

Various processes have been developed to produce blanks for battery electrodes. One approach is to calendar the blanks. In many calendering processes, the blank is passed through a series of roll presses where the nip gap becomes progressively smaller. However, many blanks typically do not have the structural integrity to survive calendering down to the smaller thickness that is frequently desired for battery electrodes.

As a result, there is a need for improved batteries and battery electrodes.

SUMMARY

Fabricating an electrode blank includes baking a blank precursor. The blank precursor contains the components of an electrode active medium including an active material. Fabricating the electrode blank also includes performing one or more post-bake calender operations after baking the blank precursor. Each post-bake calender operation includes calendering the blank precursor.

Fabricating an electrode blank includes baking a blank precursor. The blank precursor contains the components of an electrode active medium including an active material. Fabricating the electrode blank also includes performing one or more pre-bake calender operations before baking the blank precursor. Each pre-bake calender operation includes calendering the blank precursor. Fabricating the electrode blank also includes performing one or more post-bake calender operations after baking the blank precursor. Each post-bake calender operation includes calendering the blank precursor.

DESCRIPTION

A fabrication process includes kneading of a blank precursor that contains the components of an electrode active medium. The blank precursor can include a binder and the kneading can be performed so as to fibrillate the binder in the blank precursor. This fibrillation adds mechanical strength to the material to allow for increasingly strenuous calendering of the blank precursor. The kneading process of the current disclosure advantageously provides a cathode having a more uniform thickness than extrusion systems. Also, the kneading process provides for a less compacted electrode sheet, which can permit electrolytes to flow well within the electrode. Enhanced electrolyte flow can decreasing the time needed for a battery to charge external components such as the capacitors in an ICD.

During the fabrication process, calendering of the blank precursor is done after baking of the blank precursor. The baking process has been found to increase the mechanical strength of the blank precursor enough to allow the electrode black to survive calendering at lower thickness levels. For instance, calendering after the baking process has resulted in an increase in blank yields from 60-70% to 70-80% even at thickness levels below 0.012 inches.

In some instance, the fabrication process includes calendering the blank precursor before and after the baking process. Before the baking process, the electrode blank can readily withstand calendering while the blank precursor is thick. As a result, the calendering before the baking process can be used to quickly and substantially reduce the thickness of the blank precursor. The subsequent baking process allows the blank precursor to withstand the calendering at the lower thickness levels that may be desired for the electrode blank. Accordingly, calendering after the baking process can provide smaller reductions in the thickness of the blank precursor. As a result, the fabrication process can provide the increased blank yield associated with calendering after the baking process while keeping benefits of calendering before the baking process.

Figure 1:
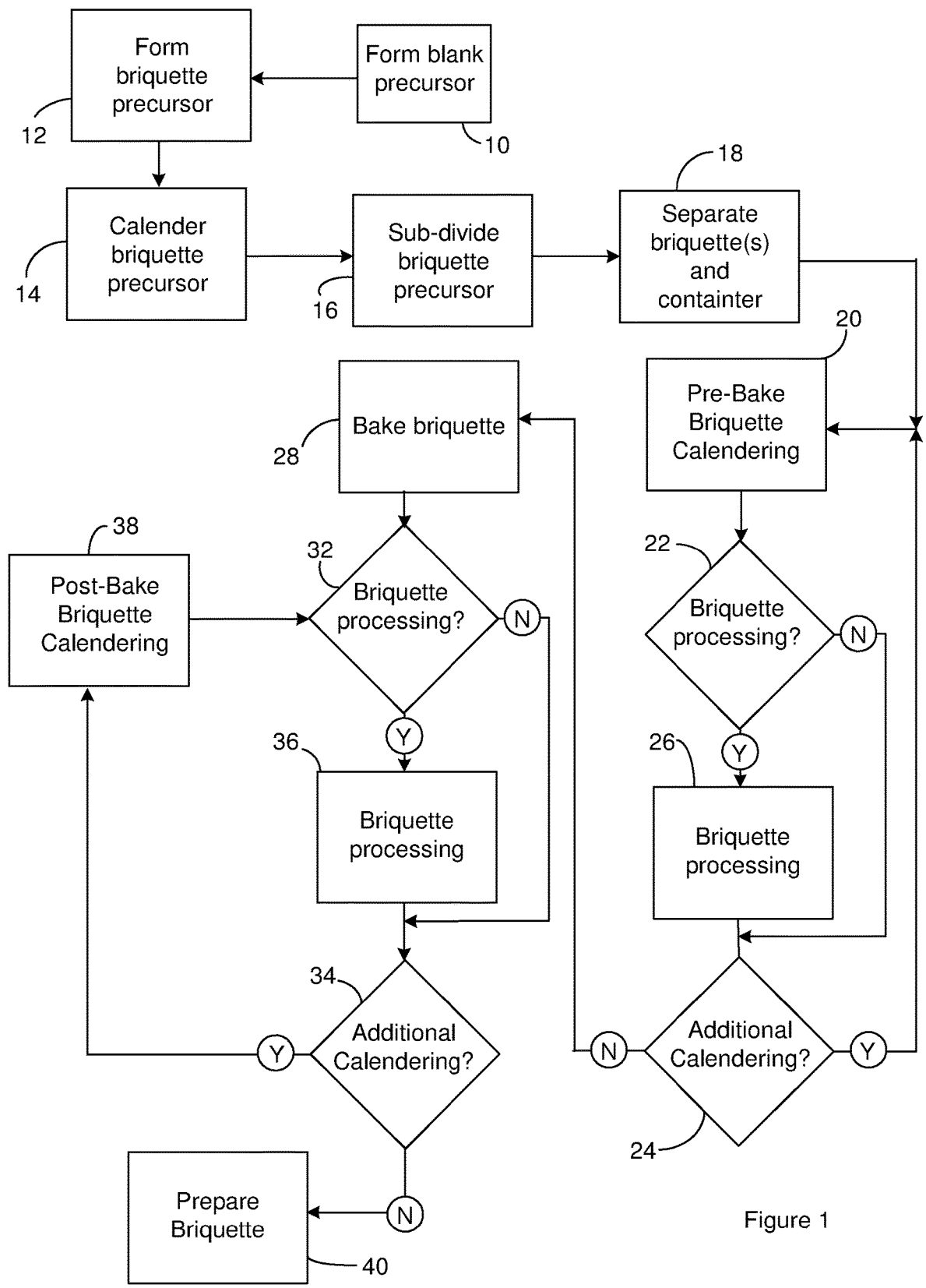
FIG. 1 is an example of a process flow for a fabrication process that can be used to fabricate an electrode blank from which an electrode can be assembled.

FIG. 1 is an example of a process flow for a fabrication process that can be used to fabricate an electrode blank from which an electrode can be fabricated. The electrode blank can be a blank for an anode, a cathode, a positive electrode and/or a negative electrode of an electrochemical energy storage device such as a battery or a capacitor.

At process block 10, a blank precursor is fabricated. The blank precursor includes one or more components of an electrode active medium. For instance, the blank precursor can include one or more active materials and one or more materials selected from the group consisting of one or more binders, one or more diluents, and one or more electrical conductors.

The blank precursor can also include one or more active medium solvents. Suitable active medium solvents include, but are not limited to, paraffins and liquid paraffin. Suitable paraffins include, but are not limited to isoparaffins such as Isopar® G available from Exxon Mobile. In some instances, a suitable paraffin is liquid at standard temperature and pressure. The components of the blank precursor are combined so as to provide the blank precursor with a deformable consistency at room temperature and pressure. For instance, the blank precursor can have a consistency of a paste, a filter cake, a puree, or a pulp.

At process block 12, a briquette precursor is generated. In some instances, the briquette precursor includes the blank precursor in a container. The container can also be deformable at room temperature and pressure. The container may also be deformable though the application of pressure. In some instances, the container has an open end and a closed end. For instance, the container can be a bag, tube, or a die or fixture with pre-defined dimensions for the blank precursor. Suitable materials for the bag include, but are not limited to, plastics and polymers. In one example, the container is a soft plastic tube or polymer bag. In some instances, the container is shaken or otherwise agitated until the blank precursor is in the bottom one third of the container. Additionally or alternately, the container can be laid flat at a works station and the blank precursor can be flattened into a bottom portion of the container. In some instances, the blank precursor is flattened in the container using the palm of a hand and/or using one or more tolls such as a scoopula.

The use of the container is optional. For instance, an alternative to placing the blank precursor in a container is to extract a portion of the blank precursor having particular dimensions and/or particular volume. The extracted blank precursor can serve as the briquette precursor. Suitable methods for extracting the blank precursor include, but are not limited to, using a die to extract a portion of the blank precursor having desired dimensions and/or desired volume.

At process block 14, a precursor calendering operation is performed on the briquette precursor one or more times so as to produce a precursor sheet. When the briquette precursor includes a container with a closed end, the precursor calendering operation can include passing the container through a calender machine by inserting the closed end of the container between rollers of the calender machine. In some instances, the diameter of the rollers is 4 inches or smaller in order to provide a precursor sheet that is less compacted. In certain embodiments, the rollers are 1 inch to 3 inches in diameter. Without being limited to theory, it is believed that providing for a less compacted precursor sheet can enable an electrolyte to flow well through the resulting electrode. In a device such as a battery, increased electrolyte flow through the electrode can decrease the amount of time the battery takes to charge a capacitor.

Various nip gap settings may be used for the rollers used in the precursor calendering operation depending on the desired thickness of the precursor sheet. The resulting thickness of the blank precursor sheet is generally thicker than the nip gap allowing the blank and blank precursor to be formed to thinner dimensions through the calender. For example, when the desired thickness of the blank precursor is 0.012 inches, a nip gap of 0.09 inches may be used to produce a blank precursor having a thickness around 0.012 inches.

When the briquette precursor includes a container with a closed end and there is to be additional precursor calendering operations performed on the briquette precursor, after the briquette precursor exits the calendering machine at process block 14, the container can be opened and the blank precursor moved back to the bottom portion of the container. In some instances, the movement of the blank precursor back to the bottom of the container can be a result of shaking or otherwise agitating the container until the blank precursor is within the bottom third of the container. The container can then be run through the calender machine again using the same nip gap setting each time or decreasing the nip gap setting for all or a portion of the one or more precursor calendering operations at process block 14. In some instances, the number of precursor calendering operations at process block 14 can be a pre-determined number. In some instances, the number of precursor calendering operations at process block 14 can be determined in response to the consistency of the blank precursor. For instance, if the consistency of the blank precursor indicates that the blank precursor needs additional calendering to provide additional fibrillation, one or more additional precursor calendering operations can be performed at process block 14. In some instances, the number of precursor calendering operations at process block 14 is greater than or equal to 1.

In some instances, the briquette precursor is pressed before, between, or after the one or more precursor calendering operations. Pressing the briquette precursor may increase the uniformity of the briquette precursor and/or the resulting precursor sheet. Suitable mechanisms for pressing the briquette precursor include, but are not limited to, a press.

In some instances, the precursor sheet that results from the one or more precursor calendering operations is divided at process block 16. For instance, the precursor sheet can be cut so as to provide one or more briquettes of the blank precursor that each has the desired dimensions. In some instance where the precursor sheet includes a container such as a bag, the container is cut in intervals so as to provide multiple briquettes of the blank precursor. Suitable cutting methods include, but are not limited to, stamping, slicing with a blade, cutting with mechanical cutting tools such as spatulas or scissors.

Dividing the precursor sheet can be optional. For instance, when a die is used to extract the extracted blank precursor. The die can be configured to provide the extracted blank precursor with the dimensions and/or volume desired for the briquette. As a result, in some instances where an extracted blank precursor serves as the briquette precursor, the briquette precursor need not be cut or divided. Accordingly, the precursor sheet that results from the briquette precursor can serve as the briquette.

Where the briquette includes all or a portion of the container, a briquette of the blank precursor can be separated from the container at process block 18. For instance, the container can be removed from the briquette by peeling, cutting, lifting, and/or slicing. Separating the briquette and container can be optional. For instance, when the briquette precursor does not include a container, there is no need to separate the briquette and container. As an example, when an extracted blank precursor serves as the briquette precursor, the briquette need not be separated from a container.

At process block 20, one or more pre-bake calender operations are performed on one of the briquettes. Each pre-bake calendering operation can include passing the briquette between rollers of a calender machine. In some instances, the same elongation ratio is kept in both the machine direction (MD) and the transverse direction (TD) during all or a portion of the one or more pre-bake calender operations. The elongation ratio is the percentage change in the nip gap setting of the current pre-bake calender operation relative to the immediately prior pre-bake calender operation.

In some instances, the first pre-bake calender operation uses the same or smaller nip gap settings than the nip gap setting of one or more of the precursor calendering operations. In one example, the first pre-bake calender operation uses the same or smaller nip gap setting than the smallest nip gap setting used in the precursor calendering operations. In some instances of the one or more pre-bake calender operations, the nip gaps are set such that a nip reduction ratio is less than or equal to 60%, or 70% of the nip gap for the prior pre-bake calender operation. As an example with a 60% nip reduction ratio, after a pre-bake calender operation using a nip gap setting of 0.08 inches, a nip gap setting greater than or equal to 0.032 inches (40% reduction) and less than equal to may 0.08 inches (0.0% reduction) can be used in the next pre-bake calender operation.

In some instances, reduced calender roll diameters can be used for all or a portion of the one or more of the pre-bake calender operations to promote stretching, rather than compacting during the calendering process. In some instances, the calender roll diameters for all or a portion of the one or more of the pre-bake calender operations is greater than 1.0 inches and/or less than 3.0 inches.

Block 22 through block 26 illustrate that none, one, or more than one briquette processing operation are performed after each of the pre-bake calender operations from process block 20. For instance, after each pre-bake calender operation, the fabrication process can proceed to alternative block 22. From alternative block 22, when there are no briquette processing operations to be performed after the prior pre-bake calender operation, the fabrication process proceeds to alternative block 24. In contrast, the fabrication process proceeds from alternative block 22 to process block 26 when there are one or more briquette processing operations to be performed after the prior pre-bake calender operation. After the one or more briquette processing operations, the fabrication process proceeds from process block 26 to alternative block 24.

Examples of one or more briquette processing operations include, but are not limited to, rotation of the briquette, folding of the briquette, sub-dividing of the briquette, and stacking of sub-divided briquettes. The first pre-bake calender operation is performed on the briquette in the machine direction. However, a briquette processing operation with briquette rotation can change the direction for a subsequent pre-bake calender operation. For instance, rotation of the briquette can be a rotation such that the calendering direction applied to the briquette changes such that the next pre-bake calender operation is performed in a different direction than the immediately previous pre-bake calender operation. As an example, a 90° rotation of the briquette can make the next pre-bake calender operation a calender in the machine direction where the prior pre-bake calender operation was in the transverse direction or can make the next pre-bake calender a calender in the transverse direction when the prior pre-bake calender operation was in the reverse machine direction. Table 1 lists additional examples of the briquette rotation angle and the resulting change in calender direction. The results of briquette rotations over negative angles can also be determined from Table 1.

TABLE 1

| Prior Calender Direction | Rotation range | Next Calender Direction |
| --- | --- | --- |
| transverse | 90° | machine |
| machine | 90° | reverse transverse |
| reverse transverse | 90° | reverse machine |
| reverse machine | 90° | transverse |
| transverse | 180° | reverse transverse |
| machine | 180° | reverse machine |
| reverse transverse | 180° | transverse |
| reverse machine | 180° | machine |

TABLE 1-continued

| Prior Calender Direction | Rotation range | Next Calender Direction |
| --- | --- | --- |
| transverse | 270° | reverse machine |
| machine | 270° | transverse |
| reverse transverse | 270° | machine |
| reverse machine | 270° | reverse transverse |

A folding briquette processing operation can result in folding of the briquette before the next pre-bake calender operation. The folded briquette can serve as the briquette for the purposes of the next pre-bake calender operation. For instance, the folded briquette can be fed into the calendering machine during the next pre-bake calender operation. In some instances, the fold is a fold of the briquette in half or substantially in half. A sub-dividing briquette processing operation can include dividing of the briquette into smaller sub-briquettes. Suitable methods of sub-dividing a briquette include, but are not limited to, tearing or cutting the briquette. Sub-divided briquettes can be pressed together and/or stacked so as to re-fabricate the briquette for the next pre-bake calender operation. In some instances, one of the sub-divided briquettes serves as the briquette for subsequent fabrication process operations. Any other remaining sub-divided briquettes can be discarded, or processed in parallel with the briquette, or processed in series with the briquette.

Cutting the briquette and re-fabricating the briquette or folding the briquette or cutting the briquette can increase fibrillation in both the transverse direction and the machine direction. In some instances, cutting and re-fabricating the briquette can be advantageous over folding the briquettes for easier process handling.

At alternative block 24, when the desired number of pre-bake calendering operations has not yet been performed, the fabrication process returns to process block 20 for additional pre-bake calendering of the briquette. However, when the desired number of pre-bake calender operations has been performed, the fabrication process proceeds to process block 28. A suitable number of pre-bake calender operations includes, but is not limited to, numbers greater or equal to 1.

At process block 28, a baking operation is performed on the briquette. Suitable baking operations include baking the briquette in an oven at a temperature greater than or equal to 70° C., or 100° C. and/or less than or equal to 150° C., or 200° C. for a period of time greater than or equal to 20 minutes, or 50 minutes and/or less than or equal to 100 minutes, or 150 minutes. In some instances, the briquette is baked at a pressure greater than or equal to −200 inches mercury, −100 inches mercury, −50 inches mercury and/or less or equal to than 0 inches mercury. The baking operation removes the one or more active medium solvents from the briquette and can provide setting of polymer materials in the briquette.

The fabrication process proceeds from process block 28 to alternative block 32. Alternative block 32 through process block 36 illustrate that none, one, or more than one briquette processing operation can be performed before all or a portion of each one of one or more post-bake calender operations at process block 38. For instance, after the baking operation at process block 28, the fabrication process can proceed to alternative block 32. When there are no briquette processing operations to be performed before the next post-bake calender operation, the fabrication process proceeds from alternative block 32 to alternative block 34. In contrast, when there are one or more briquette processing operations to be performed before the next post-bake calender operation, the fabrication process proceeds from alternative block 32 to process block 36. After the one or more briquette processing operations are performed, the fabrication process proceeds from process block 36 to alternative block 34.

Examples of one or more briquette processing operations include, but are not limited to, rotation of the briquette, folding of the briquette, sub-dividing of the briquette, stacking of sub-divided briquettes. Rotation of the briquette can be a rotation such that the calendering direction applied to the briquette changes such that the next post-bake calender operation is performed in a different direction than the immediately previous calender operation whether the immediately previous calender operation was a pre-bake calender operation or a post-bake calender operation. The relationship between the briquette rotation angle and the resulting change in calender direction are disclosed in the context of Table 1.

A folding briquette processing operation can result in folding of the briquette before the next post-bake calender operation. The folded briquette can serve as the briquette for the purposes of the next post-bake calender operation. For instance, the folded briquette can be fed into the calendering machine during the next post-bake calender operation. In some instances, the fold is a fold of the briquette in half or substantially in half. A sub-dividing briquette processing operation can include dividing of the briquette into smaller sub-briquettes. Suitable methods of sub-dividing a briquette include, but are not limited to, tearing and/or cutting the briquette. Sub-divided briquettes can be pressed together and/or stacked so as to re-assemble the briquette for the next post-bake calender operation. In some instances, one of the sub-divided briquettes serves as the briquette for subsequent fabrication process operations. Any other remaining sub-divided briquettes can be discarded, or processed in parallel with the briquette, or processed in series with the briquette.

At alternative block 34, when the desired number of post-bake calender operations has not yet been performed, the fabrication process proceeds to process block 38 for post-bake calendering of the briquette. The one or more post-bake calender operations are performed on one of the briquettes. Each post-bake calendering operation can include passing the briquette between rollers of a calender machine. In some instances, the same elongation ratio is kept in both the machine direction (MID) and the transverse direction (TD) during all or a portion of the one or more post-bake calender operations. A suitable number of post-bake calender operations includes, but is not limited to, numbers greater or equal to 0, 1, or 2, and/or less than or equal to 10, or 20.

In some instances, the first post-bake calender operation uses the same or smaller nip gap settings than the nip gap setting of one or more of the pre-bake calender operations. In one example, the first pre-bake calender operation uses the same or smaller nip gap setting than the smallest nip gap setting used in the pre-bake calender operations. In some instances of the one or more post-bake calender operations, the nip gaps are set such that a nip reduction ratio is greater than or equal to 0% and/or less than or equal to 30% of the nip gap for the prior post-bake calender operation or the prior pre-bake calender operation when the last calender operation was a pre-bake calender operation.

In some instances, reduced calender roll diameters can be used for all or a portion of the one or more of the post-bake calender operations to promote stretching, rather than compacting during the calendering process. In some instances, the calender roll diameters for all or a portion of the one or more of the post-bake calender operations is greater than or equal to 1.0 inches and/or less than or equal to 3.0 inches.

The nip gap settings during the pre-bake calender operation(s) and the post-bake calender operation(s) can be selected so the reduction in the thickness of the briquette occurs primarily during the one or more pre-bake calender operations. In this configuration, the majority of the thickness reduction can occur before baking and while the blank precursor is "wet" due to retaining larger levels of the one or more gain medium solvents. Additionally, the calendering that occurs at the lower thickness levels is done with the mechanical strength added by the baking process. In some instances where more than one pre-bake calender operation is performed, a total reduction in the nip gap during the one or more pre-bake calender operations can be greater than or equal to 0.02 and/or less than 2". Additionally or alternately, in some instances where more than one post-bake calender operation is performed, a total reduction in the nip gap during the one or more post-bake calender operations can be less than or equal to 0.02" and can be 0.0" when the nip gap is not changes. As a result, a ratio of the total reduction in the nip gap during the one or more pre-bake operations to the total reduction in the nip gap during the one or more post-bake operations can be more than 1.1:1, 2:1, or 100:1 and/or less than or equal to infinity. The possibility of the infinite ratio occurs when the total reduction in the nip gap during the one or more post-bake operations is zero.

In some instances, there is a change in the nip gap between the last pre-bake calender operation and the first post-bake calender operation. The inventors have found that in some instances, the baking operation causes an increase in the thickness of the briquette. As a result, in some instances, the nip gap for the last pre-bake calender operation is narrower than the nip gap for the first post-bake calender operation. In some instances, the nip gap during the first post-bake calender operation is within 80% to 120% of the nip gap during the last pre-bake calendering operation.

When the desired number of post-bake calender operations has been performed at alternative block 34, the fabrication process proceeds to process block 40 where the briquette is prepared for use in the fabrication of an electrode. The briquette preparation can include none, one, two, or more than two operations selected from a group consisting of a briquette resting period, a drying the briquette, settling the briquette, a drying press, cutting of the briquette into coupons, and a finishing bake.

There can be a briquette resting period between the last post-bake calender operation and further processing of the briquette. During the rest period, the briquette can be allowed to stand in the ambient room atmosphere at approximately room temperature and pressure without further manipulation by machine or operator. Suitable rest periods include, but are not limited to, rest periods greater than or equal to 15 minutes, 30 minutes.

Preparing the briquette can optionally include drying the briquette and/or expediting the settling of the briquette. Drying the briquette can include remove the one or more active medium solvents and/or water from the briquette. Suitable methods of drying the briquette include, but are not limited to, baking the briquette and/or pressing the briquette. Suitable methods of expediting the settling of the briquette include, but are not limited to, baking the briquette. Baking the briquette so as to dry the briquette and/or expedite settling of the briquette can include baking in an oven at a temperature greater than or equal to 100° C., or 115° C. and/or less than or equal to 125° C., or 150° C. for a period of time greater than or equal to 15 minutes and/or less than or equal to 75 minutes. In some instances, the bake is performed in at atmosphere at a pressure greater than or equal to −200 inches mercury, −100 inches mercury, −50 inches mercury and/or less or equal to than 0 inches mercury. Different bake times may be used depending on the ramp-up time of the oven. In certain embodiments, a microwave oven or other oven with a similarly fast ramp-up time may be used, which would lower the baking time required. Also, drying times depend on the temperature used. Higher temperatures require shorter drying times, and lower temperatures require longer drying times. The briquette can be baked until all or substantially all (only a residual amount (ppm) is left) active medium solvent is removed. In instances, the briquette can be weighed after a drying bake to determine whether substantially all active medium solvent has been removed from the briquette. A bake for drying the briquette can be the same or different from a bake for settling the briquette.

Preparing the briquette can include cutting the briquette into coupons. Suitable methods of cutting include, but are not limited to, stamping, slicing with a blade, cutting with mechanical cutting tools. Cutting of the briquette into coupons may be optional. For instance, cutting briquette into coupons may not be needed when an extracted blank precursor serves as the briquette precursor. As an example, the briquette precursor can be generated to have a volume where the subsequent processing results in a briquette with the dimensions and/or volume that is desired for a coupon. In these instances, the briquette can serve as the coupon.

Preparing the briquette can include pressing of the briquette and/or a coupon. Suitable methods of pressing the coupon include, but are not limited to, pressing with a hydraulic press having platens or fixtures. The coupons can be pressed to a thickness at or near a thickness that is desire for an electrode active medium. In some instances, the coupons serve as the active medium blank from which the electrode is prepared.

In some instances, a finish bake is performed on the coupon(s) after pressing and the baked coupons serve as the active medium blank from which the electrode is prepared. Suitable finish bake includes baking the coupon(s) in an oven at a temperature greater than or equal to 100° C., or 115° C. and/or less than or equal to 125° C., or 150° C. for a period of time greater than or equal to 15 minutes and/or less than or equal to 75 minutes. In some instances, the bake is performed in at atmosphere at a pressure greater than or equal to −200 inches mercury, −100 inches mercury, −50 inches mercury and/or less or equal to than 0 inches mercury.

One or more active medium blanks prepared as disclosed above can be coupled with a current collector to provide an electrode for use in an electrochemical energy storage device. The resulting electrode has one or more layers of the active medium in electrical communication with the current collector. Suitable methods for coupling the active medium blank with the current collector include, but are not limited to, pressing the active medium blank onto the current collector.

Figure 2:
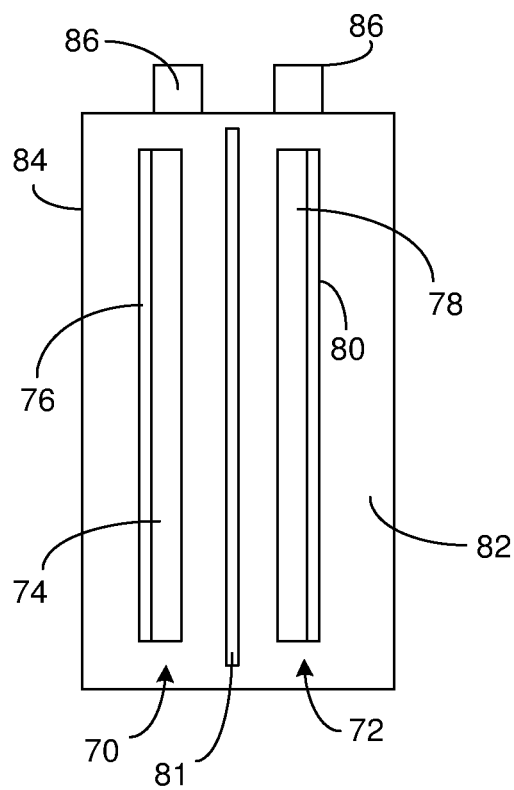
FIG. 2 is a cross section of a generalized example of a battery.

FIG. 2 is a cross section of a generalized example of a battery. The battery includes one or more first electrodes 70 alternated with one or more second electrodes 72. The first electrodes 70 include a first active medium 74 on a first current collector 76 and the second electrodes 72 include a second active medium 78 on a second current collector 80. The first electrodes 70 can be cathodes and the second electrodes 72 can be anodes or the first electrodes 70 can be positive electrodes and the second electrodes 72 can be negative electrodes. One or more of the first electrodes and/or one or more of the second electrodes can be fabricated according to the disclosed fabrication process.

A separator 81 is positioned between adjacent first electrodes 70 and second electrodes 72. An electrolyte 82 is positioned in a case 84 so as to activate the one or more first electrodes 70 and the one or more second electrodes 72. The battery includes terminals 86 that can be accessed from outside of the case 84. Although not illustrated, the one or more first electrodes 70 are in electrical communication with one of the terminals 86 and the one or more second electrodes 72 are in electrical communication with another one of the terminals 86. In some instances, the case serves as one of the terminals. Although the battery is illustrated with the one or more first electrodes 70 and the one or more second electrodes 72 in a stacked configuration, the one or more first electrodes 70 and the one or more second electrodes 72 can be in another configuration such as a jellyroll configuration.

One example of the battery includes a first electrode that is a cathode constructed according to the fabrication process of FIG. 1. The first active medium includes one or more cathode active materials selected from the group consisting of silver vanadium oxide (SVO), copper vanadium oxide, manganese dioxide, copper silver vanadium oxide (CSVO), carbon, fluorinated carbon, metal oxide and carbon monofluoride (CFx), metal oxide and carbon monofluoride, mixed SVO and CFx, cobalt oxide and nickel oxide, titanium disulfide, and can include other cathode active materials typically used in lithium anode electrochemical cells.

In addition to the one or more cathode active materials, the first active medium includes none, one, or more than one component selected from the group consisting of binder, electrical conductor, and diluent. Suitable binders include, but are not limited to, polymeric binders including fluoro-resin binders such as polytetrafluoroethylene (PTFE), polyvinylidene fluoride (PVDF), polyethylenetetrafluoroethylene (ETFE), a polyamide or a polyimide, and mixtures thereof. Suitable electrical conductors include, but are not limited to, acetylene black, carbon black, graphite, and metal powders of nickel, aluminum, titanium and stainless steel. Suitable diluents include, but are not limited to, ISOPAR.

Suitable first current collectors include, but are not limited to, meshes, screens, and foils. Suitable materials for the first current collector include, but are not limited to, copper, nickel, and nickel-plated steel, stainless steel, titanium, and combinations thereof.

In the example battery, the second electrode is an anode. The second active medium can include one or more anode active materials selected from the group consisting of materials capable of intercalating and de-intercalating lithium ions such as lithium metal and carbonaceous materials including any of the various forms of carbon such as coke, graphite, acetylene black, carbon black, glassy carbon, pitch carbon, synthetic carbon, mesocarbon microbeads, and mixtures thereof.

In addition to the one or more anode active materials, the second active medium includes none, one, or more than one component selected from the group consisting of binder, electrical conductor, and diluent. Suitable binders include, but are not limited to, polymeric binders including fluoro-resin binders such as polytetrafluoroethylene (PTFE), polyvinylidene fluoride (PVDF), polyethylenetetrafluoroethylene (ETFE), a polyamide or a polyimide, and mixtures thereof. Suitable electrical conductors include, but are not limited to, carbon black and graphite.

Suitable second current collectors include, but are not limited to, meshes, screens, and foils. Suitable materials for the second current collector include, but are not limited to, copper, nickel, and nickel-plated steel, stainless steel, titanium, and combinations thereof.

Suitable electrolytes include, but are not limited to, electrolytes having one or more salts dissolved in one or more solvents. Suitable salts include, but are not limited to, alkali metal salt including $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable solvents include, but are not limited to, aprotic organic solvents including low viscosity solvents and high permittivity solvents and mixture of aprotic organic solvents that include a low viscosity solvent and a high permittivity solvent. Suitable now viscosity solvents include, but are not limited to, esters, linear and cyclic ethers and dialkyl carbonates such as tetrahydrofuran (THF), methyl acetate (MA), diglyme, trigylme, tetragylme, dimethyl carbonate (DMC), 1,2-dimethoxy-ethane (DME), 1,2-diethoxyethane (DEE), 1-ethoxy,2-methoxyethane (EME), diethyl carbonate, ethyl methyl carbonate, and mixtures thereof. Suitable high permittivity solvents include, but are not limited to, cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

Suitable separators include, but are not limited to, fabrics woven from fluoropolymeric fibers including polyvinylidene fluoride, polyethylenetetrafluoroethylene, and polyethylenechlorotrifluoro-ethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

In one example of the battery where the first electrode is a cathode and the second electrode is an anode, the first active medium includes silver vanadium oxide (SVO) as the first active material, polytetrafluoroethylene (PTFE) as the binder, and graphite and carbon black as electrical conductors; lithium metal as the second active medium; a polymeric separator; and an electrolyte that is 0.8M to 1.5M $LiAsF_6$ or $LiPF_6$ dissolved in a 50:50 mixture, by volume, of propylene carbonate as a preferred high permittivity solvent and 1,2-dimethoxyethane as a low viscosity solvent.

As is evident from the above discussion, the electrode active medium is fabricated from the blank precursor. In some instances, the composition of the active medium is the same or essentially the same as the composition of the blank precursor with a reduced level of the one or more active medium solvents, without the one or more active medium solvents, or substantially without the one or more active medium solvents.

The initial blank precursor (the blank precursor before the first precursor calender operation) for an electrode can be fabricated by mixing the components of an electrode active medium. For instance, the one or more active materials can be mixed with none, one, or more than one binders; none, one, or more than one electrical conductors; and none, one, or more than one diluent. The resulting component mixture is generally a dry mixture. One or more of the active medium solvents can be added to the component mixture so as to generate a precursor component mixture. In certain embodiments, at least on active medium solvent is a liquid paraffin, such as Isopar® G available from Exxon Mobile. Liquid paraffin wets well with the electrode components and it is also inert.

In some instances, the concentration of the one or more active medium solvents in the precursor component mixture is generated such that at least one of the one or more active medium solvents acts as a solvent for one or more components of the electrode active medium and/or as a lubricant for the subsequent calendering operations. A suitable weight ratio for solids in the precursor component mixture includes ratios greater than 60 wt % or 85 wt % and/or less than 94.5 wt % or 95 wt %. In an example where the active material is SVO, the precursor component mixture is generated with a liquid to solid weight ratio greater than 80 wt %, or 93.5 wt % and/or less than 94.5 wt % or 97 wt %.

The precursor component mixture can be mixed. Suitable methods of mixing include, but are not limited to, mixing with a high speed high shear mixer such as a homogenizer, or a blender. After mixing, the solvent weight ratio of active medium solvent to electrode active medium components can be reduced. Suitable methods of reducing the solvent weight ratio include, but are not limited to, vacuum filtration, press filtration, heat evaporation, and centrifuge filtration processes. The solvent weight ratio can be performed so as to remove sufficient solvent to convert the precursor component mixture to the consistency that is desired for the initial blank precursor. In some instances, the solvent weight ratio is reduced to a level less than 50% or 30% and/or greater than 10%. In an example where SVO is used as an active material in the electrode, the solvent weight ratio is reduced to approximately 15%. Other solvent weight ratio may be used to achieve the desired consistency. In many instances, the solvent weight ratio is reduced so as to provide the initial blank precursor with the consistency of a filter cake. In an example where SVO is used as an active material in the electrode, the solvent weight ratio is reduced so as to provide the initial blank precursor with the consistency of a filter cake.

Figure 3:
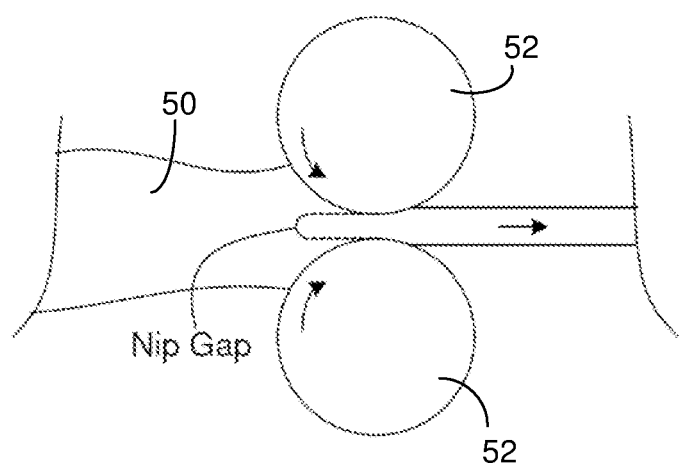
FIG. 3 is an illustration of an example of a calendering operation.

FIG. 3 is an illustration of an example of a calendering operation that is suitable for use as one or more of the disclosed calendering operations. FIG. 3 illustrates a product 50 being passed between rollers 52. The rollers 52 are positioned such that the product 52 is compressed as a result of being passed between the rollers 52. As illustrated by the arrows in FIG. 3, the rollers 52 can be rotated such that the rotation of the rollers 52 causes movement of the product 50 between the rollers 52. The briquette precursor, the blank precursor, the container, the briquettes, and other disclosed components can serve as the product 50. Although FIG. 3 illustrates two rollers, calendering operations can include more than two rollers.

Example 1

A precursor blank was fabricated. Silver vanadium oxide (SVO), graphite, carbon black, and polytetrafluoroethylene (PTFE) powder were weighed out and placed in a beaker so as to provide a component mixture that was 94 wt % SVO, 1 wt % graphite, 2 wt % carbon black, and 3 wt % PTFE. Weights were 188 g SVO, 2 g graphite, 4 g carbon black, and 6 g PTFE. A precursor component solution was generated by adding 240 g±0.005 g of liquid paraffin Isopar® G to the component mixture using a plastic stirrer to stir slowly and provide a 1.2 liquid to 1.0 solid to weight ratio. The precursor component solution was mixed using a Dynamic MX070 MiniPro Mixer, slowly increasing the speed and run five minutes±30 seconds at maximum speed to form a thick paste.

The precursor component solution having the paste consistency was placed on to 9.0 cm Fisher Scientific® P2 Grade filter paper in a Büchner funnel. A vacuum was applied to the funnel and the precursor component solution was vacuumed until slight cracks formed on the surface to form an initial blank precursor with the consistency of a filter cake.

Approximately one half of the initial blank precursor was then placed in a 2⅝ inch×15 inch poly bag that served as the container to provide the briquette precursor. The remaining portion of the initial blank precursor was placed in another poly bag. The poly bag was held up gently and shaken until the material was in the bottom one third of the bag. The bag was then laid flat on a work surface and the cake material was manually flattened into the bottom five inches of the poly bag. A manual roller was used to ensure that there were no voids or air pockets between the material and the bag.

A precursor calender operation was performed on the briquette precursor by inserting the closed end of the bag between rollers (diameter of 1.5 inches) of an Imperia RM220 electric pasta machine, available from Emiolmiti®, using a nip gap setting of 0.08 inch and calendering. The bag was then opened up and the bag was shaken to knock the material down to the bottom third of the bag. The precursor calender operation (using the same nip gap setting) and shaking step were repeated two additional times to provide the precursor sheet.

The precursor sheet was divided. For instance, the bag was marked off at three inch intervals from the bottom of the bag up and cut at the demarcations so as to provide multiple briquettes of the blank precursor. The bag was then separated from the briquettes.

A first pre-bake calendering operation was performed on one of the briquettes by passing the briquette through calender rolls in the machine direction with the rollers set at a 0.057 inch nip gap and a speed of 85 in/min in the bottom roller and a ratio of 1.7 speed to the top roller. The briquette was rotated by 180° and a second pre-bake calendering operation was performed on the briquette by passing the briquette through calender rolls in the reverse machine direction with the rolls set at a 0.035 inch nip gap, and a speed of 65 in/min in the bottom roller and a ratio of 1.5 speed to the top roller.

The briquette was folded, and rotated by 90° and a third pre-bake calendering operations was performed on the briquette by passing the briquette through calender rolls in the transverse direction with the rollers set at a 0.030 inch nip gap and a speed of 65 in/min in the bottom roller and a ratio of 1.35 speed to the top roller. The briquette was folded and rotated by 90° and a fourth pre-bake calendering operations was performed on the briquette by passing the briquette through calender rolls in the reverse machine direction with the rollers set at a 0.0115 inch nip gap and a speed of in/min in the bottom roller and a ratio of 1.35 speed to the top roller. The total reduction in the nip gap during the pre-bake operations was 0.0455 inches.

A bake operation was performed on the briquette by placing the briquette in an oven at a temperature of 125° C., in an atmosphere at a pressure less than or equal to −25 inches of mercury, for 60 minutes.

The briquette was rotated 180° and a first post-bake calendering operations was performed on the briquette by passing the briquette through calender rolls in the machine direction with the rollers set at a 0.0110 inch nip gap and a speed of 50 in/min in the bottom roller and a ratio of 0.95 speed to the top roller. The briquette was rotated 180° and a second post-bake calendering operations was performed on the briquette by passing the briquette through calender rolls in the reverse machine direction with the rollers set at a 0.0110 inch nip gap and a speed of 50 in/min in the bottom roller and a ratio of 1.25 speed to the top roller. The total reduction in nip gap set point provided by the post-bake operations was 0.000.

The briquette was allowed to rest for at least 60 minutes before further processing to prepare the blank. The blank was prepared through die cutting.

The blank was attached to current collector through pressure so as to form a cathode.

Although the examples and fabrication process are described in the context of a single coupon or a single briquette, the fabrication process can be concurrently performed on multiple coupons and/or briquettes in parallel or in series.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of fabricating an electrode, comprising:
calendering a briquette precursor so as to form a precursor sheet that includes components of an electrode active medium, the components including an active material;
cutting a briquette from the precursor sheet;
baking the briquette; and
performing multiple post-bake calender operations on the briquette after the baking of the briquette, each post-bake calender operation including calendering of the briquette, and
reducing a nip gap at which the post-bake calender operations are performed, the nip gap being reduced between at least a portion of the post-bake calendering operations, a total reduction of the nip gap between a first one of the post-bake calendering operations and a last one of the post-bake calendering operations is greater than or equal to zero and less than or equal to 0.02 inches.

2. The method of claim 1, wherein the baking is done in an oven at a temperature greater than or equal to 70° C. and less than or equal to 200° C. for a period of time greater than or equal to 20 minutes and less than or equal to 150 minutes.

3. The method of claim 2, wherein the period of time is greater than or equal to 60 minutes and less than or equal to 100 minutes.

4. The method of claim 3, wherein an atmosphere in the oven is at a pressure greater than or equal to −200 inches mercury and/or less or equal to than 0 inches mercury.

5. The method of claim 1, wherein the briquette includes one or more liquid active medium solvents, and
solids in the briquette are between 60 wt % and 90 wt % of the weight of the briquette before the baking.

6. The method of claim 1, wherein the briquette includes a liquid paraffin.

7. The method of claim 1, further comprising:
performing one or more pre-bake calender operations on the briquette before the baking of the briquette, each pre-bake calender operation including calendering of the briquette.

8. The method of claim 7, wherein a gap at which the calendering is performed during one of the pre-bake calender operations is reduced between a last one of the pre-bake calender operations and a first one of the post-bake calender operations.

9. The method of claim 7, further comprising:
reducing a gap at which the calendering is performed between at least a portion of the pre-bake calendering operations.

10. The method of claim 7, wherein a ratio of a total reduction in a gap at which the calendering is performed between a first one of the pre-bake operations and a last one of the pre-bake operations to a total reduction in a gap at which the calendering is performed between a first one of the post-bake operations and a last one of the post-bake operations is more than 100:1 and less than or equal to infinity.

11. The method of claim 7, wherein a nip gap during a first one of post-bake calender operation is within 80% to 120% of a nip gap during a last one of the pre-bake calendering operations.

12. The method of claim 1, further comprising:

preparing an electrode blank from the briquette; and fabricating a battery with an electrode that includes at least a portion of the electrode blank.

13. The method of claim 12, wherein the electrode is a cathode.

14. The method of claim 13, wherein the electrode blank includes silver vanadium oxide.

15. The method of claim 1, further comprising:

cutting the briquette into coupons after performing the one or more post-bake calender operations on the briquette.

16. The method of claim 15, further comprising:

baking the coupons in an oven at a temperature greater than or equal to 100° C., and less than or equal to 150° C. for a period of time greater than or equal to 15 minutes and less than or equal to 75 minutes.

17. The method of claim 1, wherein a nip gap setting for the first one of the post-bake calendering operations is between 0.008 inches and 0.0115 inches.

* * * * *